United States Patent
Willis et al.

(10) Patent No.: US 11,343,895 B2
(45) Date of Patent: May 24, 2022

(54) EMERGENCY LIGHTING COLOR TEMPERATURE CONTROL

(71) Applicant: Hubbell Incorporated, Shelton, CT (US)

(72) Inventors: Timothy Eugene Willis, Clemson, SC (US); Terrence Arbouw, Georgetown, TX (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 17/181,524

(22) Filed: Feb. 22, 2021

(65) Prior Publication Data

US 2021/0282245 A1 Sep. 9, 2021

Related U.S. Application Data

(60) Provisional application No. 62/985,113, filed on Mar. 4, 2020.

(51) Int. Cl.
*H05B 45/20* (2020.01)
*H05B 47/10* (2020.01)
*G01N 15/06* (2006.01)
*H05B 47/105* (2020.01)
*H05B 47/155* (2020.01)
(Continued)

(52) U.S. Cl.
CPC .......... *H05B 47/105* (2020.01); *G01N 15/06* (2013.01); *G08B 5/36* (2013.01); *G08B 17/103* (2013.01); *H05B 45/20* (2020.01); *H05B 47/155* (2020.01); *G01N 2015/0693* (2013.01)

(58) Field of Classification Search
CPC .... H05B 47/10; H05B 47/105; H05B 47/155; H05B 45/00; H05B 45/20; G01N 15/06; G01N 2015/0693; G08B 5/36; G08B 17/103; H02J 9/02
See application file for complete search history.

(56) References Cited

U.S. PATENT DOCUMENTS

2015/0077737 A1 3/2015 Yamato et al.
2016/0309561 A1 10/2016 Hamilton et al.
(Continued)

OTHER PUBLICATIONS

PCT/US2021/019025 International Search Report and Written Opinion dated May 6, 2021 (14 pages).

*Primary Examiner* — Jimmy T Vu
(74) *Attorney, Agent, or Firm* — Michael Best & Friedrich LLP (57) ABSTRACT

An emergency lighting system including a light source, a variable constant current drive, an emergency alarm, and a controller. The light source includes a first light channel that produces light at a first correlated color temperature and a second light channel that produces light at a second correlated color temperature that is less than the first correlated color temperature. The variable constant current drive is configured to supply DC current to the first light channel and the second light channel. The emergency alarm is configured to be triggered upon detecting the presence of an emergency condition. The controller is configured to determine whether the emergency alarm is triggered, increase the DC current supplied to the first light channel when the emergency alarm is not triggered, and decrease the DC current supplied to the first light channel when the emergency alarm is triggered.

22 Claims, 5 Drawing Sheets

(51) Int. Cl.
*G08B 5/36* (2006.01)
*G08B 17/103* (2006.01)

(56) References Cited

U.S. PATENT DOCUMENTS

| | | |
|---|---|---|
| 2018/0160513 A1 | 6/2018 | Han et al. |
| 2019/0254131 A1 | 8/2019 | Bretzer et al. |
| 2019/0261493 A1* | 8/2019 | Dolan .................... H05B 45/10 |
| 2019/0371148 A1 | 12/2019 | Bailey |

* cited by examiner

EMERGENCY LIGHTING COLOR TEMPERATURE CONTROL

RELATED APPLICATIONS

This application claims the benefit of U.S. Provisional Patent Application No. 62/985,113, filed Mar. 4, 2020, the entire content of which is hereby incorporated by reference.

FIELD

The present application relates generally to light emitting diodes (LEDs).

SUMMARY

Light produced by ambient lighting systems (for example, emergency lights, street lights, vehicle headlights, building lights, and the like) may be subject to scattering when air in the area being lighted contains suspended particles such as fog, ice crystals, dust, smoke, etc. The amount of light scattering that occurs may depend on the size and/or concentration of suspended particles relative to the wavelength of the light produced by the ambient light sources. In general, the presence of suspended particles in air causes short wavelength light to scatter more than light having a longer wavelength. Vision in the lighted area may be obscured as a result of the light interacting with the suspended particles, and in particular, vision may be obscured more when ambient lighting systems produce light at shorter wavelengths.

Light emitting diodes (LEDs) may be used in lighting systems to provide ambient light to a surrounding area. In particular, ambient lighting systems may include a plurality of white LEDs that are configurable to illuminate a surrounding area with tunable white light. An individual white LED may be configured to produce visible white light at a particular wave length and correlated color temperature (CCT) in accordance with the type of phosphor coating included in the individual LED. For example, a first type of white LED having a first type phosphor coating may be configured to emit cool white light at a shorter wave length and higher CCT while a second type of white LED having a second type phosphor coating may be configured to emit warm white light at a longer wave length and lower CCT. Accordingly, the composite, or combined, white light emitted by an ambient lighting system that includes various types of white LEDs may be tuned to a desired wavelength and/or CCT.

In some situations, it may be advantageous for ambient lightto contain a larger concentration of short wavelength frequencies because the efficacy (lumens/watt) of the lighting will increase at higher CCT ranges. However, in emergency situations and/or conditions in which the atmosphere contains suspended particles, the high efficacy, higher CCT lighting will result in more scattering and lower visibility. Accordingly, it would be advantageous reduce the CCT, or equivocally, increase the proportion of long wavelength frequencies of light produced by a lighting system during emergency situations and/or when the atmosphere contains suspended particles for improved visibility.

In one embodiment, the application provides an emergency lighting system that includes a light source. The light source includes a first light channel having a first plurality of white light emitting diodes (LEDs) that produce light at a first correlated color temperature (CCT) and a second light channel having a second plurality of white LEDs that produce light a second CCT that is less than the first CCT. The emergency lighting system further includes a variable constant current drive configured to supply DC current to the first light channel and the second light channel and an emergency alarm configured to be triggered upon detecting the presence of an emergency condition proximate the emergency lighting system. In addition, the emergency lighting system includes a controller having an electronic processor configured to determine whether the emergency alarm is triggered, increase the DC current supplied to the first light channel when the emergency alarm is not triggered, and decrease the DC current supplied to the first light channel when the emergency alarm is triggered.

In another embodiment, the application provides an ambient lighting system that includes a light source. The light source includes a first light channel having a first plurality of white LEDs that produce light at a first CCT and a second light channel having a second plurality of white LEDs that produce light a second CCT that is less than the first CCT. The ambient lighting system further includes a variable constant current drive configured to supply DC current to the first light channel and the second light channel and an air quality sensor configured to measure a concentration of particles suspended in air proximate the ambient lighting system. In addition, the ambient lighting system includes a controller having an electronic processor configured to receive a signal indicative of the concentration of particles suspended in air proximate the lighting system, compare the concentration of particles suspended in air proximate the lighting system to a first threshold, increase the DC current supplied to the first light channel when the concentration of particles suspended in air proximate the lighting system is less than the first threshold, and decrease the DC current supplied to the first light channel when the concentration of particles suspended in air proximate the lighting system is greater than or equal to the first threshold.

Before any embodiments are explained in detail, it is to be understood that the embodiments are not limited in their application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

Functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not explicitly listed.

Other aspects of the disclosure will become apparent by consideration of the detailed description and accompanying drawings.

DETAILED DESCRIPTION

Figure 1:
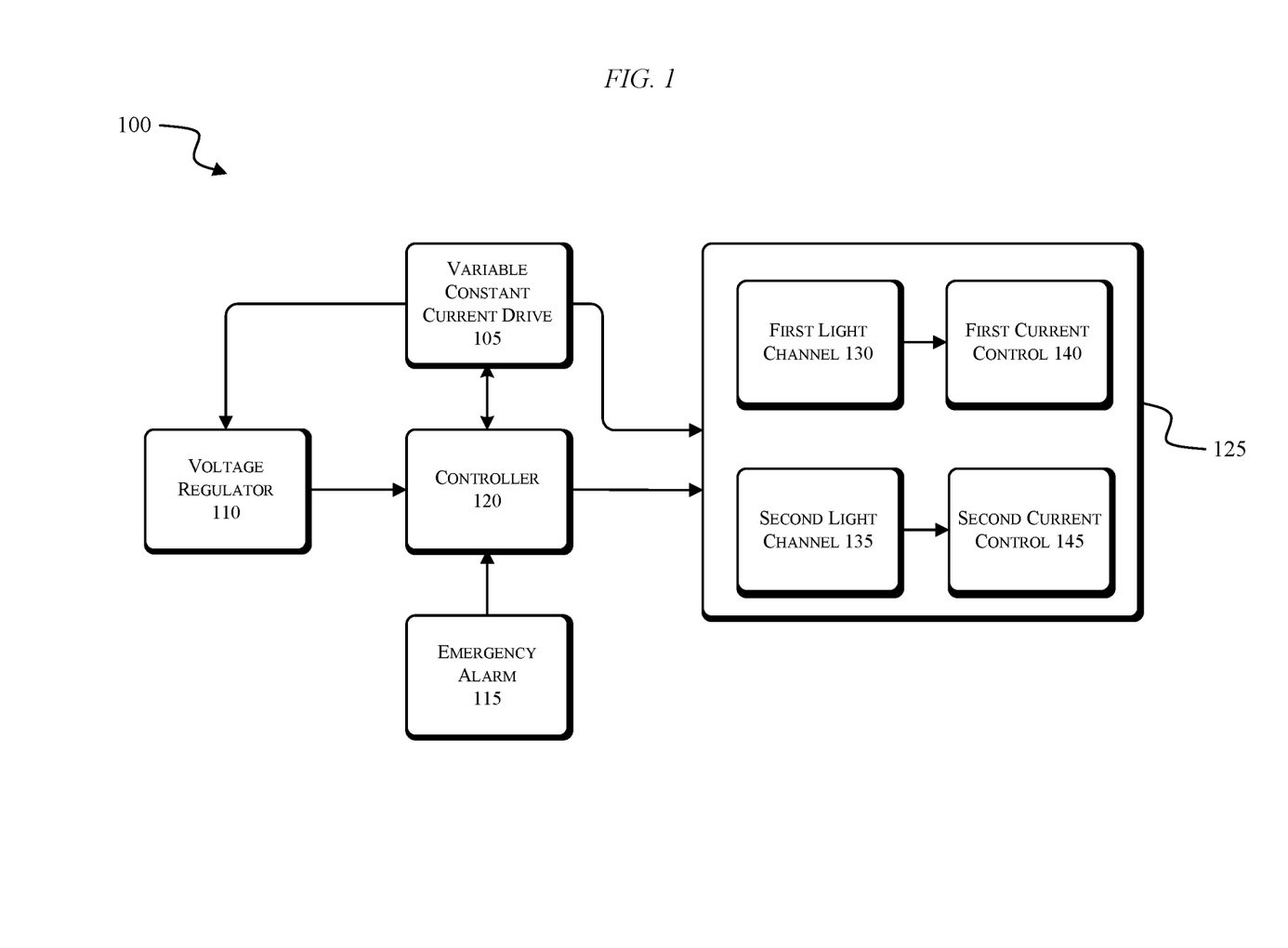
FIG. 1 is a block diagram of an emergency lighting system according to one embodiment of the application.

FIG. 1 illustrates a block diagram of a color temperature tunable emergency lighting system 100 (herein referred to simply as 'emergency lighting system') according to some embodiments. The emergency lighting system 100 may include, among other things, a variable constant current drive, or driver, 105, a voltage regulator 110, an emergency alarm 115, a controller 120, and at least one light source 125. The light source 125 may include a first light channel 130, a second light channel 135, a first current control 140, and a second current control 145. In some embodiments, the light source 125 includes more than two light channels and two current controls. For example, the light source may include as many light channels and/or current controls as are desired.

The variable constant current drive 105 receives a mains voltage (for example, approximately 120 VAC at 60 Hz, approximately 240 VAC at 60 Hz, etc.) and outputs a DC current to the voltage regulator 110. The voltage regulator 110 receives DC current output from the variable constant current drive 105 and outputs a regulated voltage (e.g., 5 VDC) to provide power to the controller 120.

The emergency alarm 115 is configured to be triggered when an emergency condition is detected proximate the emergency lighting system 100. In some embodiments, the emergency alarm 115 is automatically triggered when hazardous conditions are detected proximate the emergency lighting system 100. In such embodiments, the emergency alarm 115 may be implemented as a smoke detector, a gas detector (for example a carbon monoxide detector and/or natural gas detector), a radiation detector, and the like. In some embodiments the emergency alarm 115 is manually triggered by a user and is implemented as, for example, a fire alarm. In some embodiments, the emergency alarm is triggered when power is lost and an emergency power backup system is initiated. In some embodiments, the emergency lighting system 100 includes multiple emergency alarms 115 that are in communication with controller 120. In some embodiments, the emergency alarm 115 is configured to detect one or more of the hazardous conditions described above.

The controller 120 may be any suitable programming device that includes an electronic processor and a memory (e.g., a microprocessor, a microcontroller, etc.). In some embodiments, the controller 120 is implemented partially or entirely on a semiconductor (e.g., a field-programmable gate array semiconductor) chip, such as a chip developed through a register transfer level design process. The electronic processor may be connected to the memory and configured to execute software instructions stored in the memory. The software includes, for example, firmware, one or more applications, program data, filters, rules, one or more program modules, and/or other executable instructions. The controller 120 is configured to retrieve from the memory and execute, among other things, instructions related to the control processes and methods described herein. For example, and as discussed in more detail below, the controller 120 is configured to receive a signal from the emergency alarm 115 and respectively output a first control signal and a second control signal to the first current control 140 and the second current control 145 included in the light source 125.

As illustrated in FIG. 1, the DC current supplied by variable constant current drive 105 to the light source 125 flows through the first light channel 130 and the second light channel 135 to the first current control 140 and the second current control 145, respectively. In other embodiments, the DC current supplied by variable constant current drive 105 flows through the first current control 140 and the second current control 145 to the first light channel 130 and the second light channel 135, respectively. In some embodiments, the first light channel 130 includes a first plurality of white LEDs that produce light at a first CCT and the second light channel 135 includes a second plurality of white LEDs that produce light at a second CCT. In such embodiments, the first CCT of the first plurality of white LEDs is greater than the second CCT of the second plurality of white LEDs. Accordingly, the first plurality of white LEDs in the first light channel 130 produces shorter wavelengths of light when compared to the wavelengths of light produced by the second plurality of white LEDs included in the second light channel 135. In some embodiments, the second light channel 135 includes one or more LEDs that produce longer wavelengths of light. For example, the second light channel 135 may include one or more amber LEDs, red LEDs, yellow LEDs, or any other type of LEDs that produce light at relatively longer wavelengths. In other embodiments, the first light channel 130 and the second light channel 135 include one or more LEDs having various colors, such as but not limited to, red, green, yellow, amber, variations of white, or any other desired color.

Figure 2:
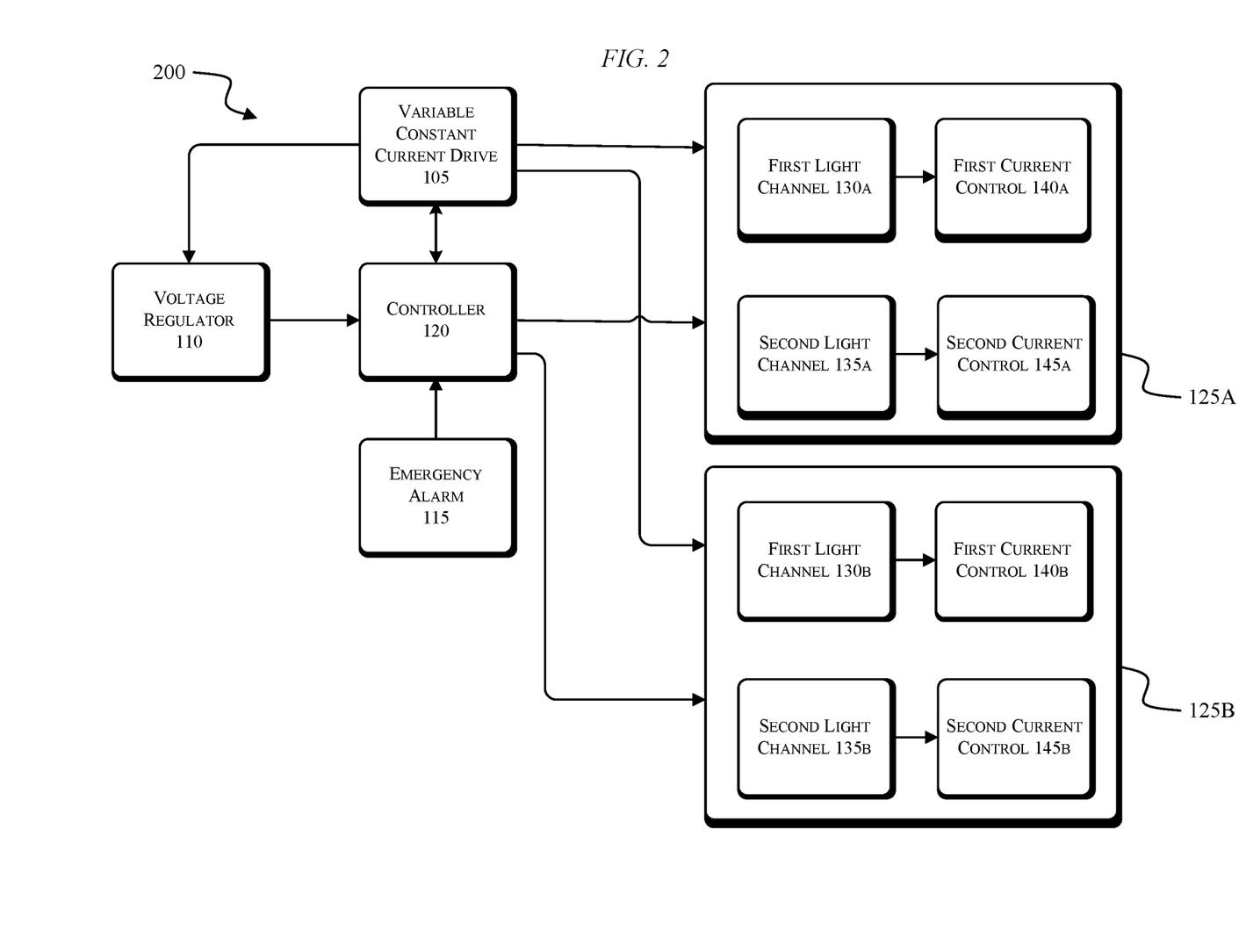
FIG. 2 is a block diagram of an emergency lighting system according to another embodiment of the application.

In some embodiments, the emergency lighting system 100 includes more than one light source 125. For example, FIG. 2 illustrates an emergency lighting system 200 that includes a first light source 125A and a second light source 125B. The first light source 125A includes a first light channel 130A, a second light channel 135A, a first current control 140A, and a second current control 145A. The second light source 125B includes a first light channel 130B, a second light channel 135B, a first current control 140B, and a second current control 145B.

As discussed above with respect to the emergency lighting system 100, DC current passes through the first light channel 130 and the second light channel 135 to the first current control 140 and the second current control 145, respectively. In some embodiments, the first current control 140 and the second current control 145 are transistors (e.g., a semiconductor device, such as but not limited to, a bipolar junction transistor (BJT), a field-effect transistor (FET), a metal-oxide-semiconductor field-effect transistor (MOSFET), a junction gate field-effect transistor (JFET), and an insulated-gate bipolar transistor (IGBT)). In such embodiments, the controller 120 outputs a first control signal and a second control signal to a first gate of the first current control 140 and a second gate of the second current control 145, respectively. Accordingly, the controller 120 controls the flow of DC current through, and equivocally, light output by the first light channel 130 and the second light channel 135. The first and second control signals may be, for example, pulse-width modulated (PWM) signals.

Light source 125 produces a combined light output of the first light channel 130 and the second light channel 135 at a composite CCT. The composite CCT of light produced by light source 125 can be adjusted by selectively controlling the DC current that is provided to the first light channel 130 and the second light channel 135. When there is no emergency condition present near the emergency lighting system 100, it is desirable for the light source 125 to produce a higher concentration of short wavelength white light (higher CCT) for improved efficacy. Accordingly, the controller 120 is configured to increase the composite CCT of the combined light output of the first light channel 130 and the second light channel 135. In contrast, when the emergency alarm 115 is triggered, meaning an emergency condition is present near the emergency lighting system 100, it is desirable for light source 125 to produce a higher concentration of long wavelength white light (lower CCT) for improved visibility. Thus, the controller 120 is configured to reduce the composite CCT of the combined light output by the first light channel 130 and the second light channel 135 when emergency alarm 115 is triggered.

The first plurality of white LEDs included in the first light channel 130 may produce light at a first CCT that is higher than a second CCT of light produced by the second plurality of white LEDs included in the second light channel 135. Therefore, to increase the composite CCT of light produced by light source 125 (or equivocally, increase the proportion of short wavelength light output by light source 125), the controller 120 controls a larger proportion of DC current supplied by variable constant current drive 105 to flow through the first light channel 130 than the second light channel 135. In other words, the controller 120 increases the duty cycle, or on time, of the first control signal sent to the first current control 140 and correspondingly reduces the duty cycle of the second control signal sent to the second current control 145. For example, the controller 120 may transmit a first control signal having a duty cycle of 0.75 to the first current control 140 such that 75% of the DC current supplied by variable constant current drive 105 is provided to the first light channel 130. Likewise, the controller 120 may transmit a second control signal having a duty cycle of 0.25 to the second current control 145 such that 25% of the DC current supplied by variable constant current drive 105 is provided to the second light channel 135. In the above example, the light produced by light source 125 of emergency lighting system 100 contains a higher proportion of short wavelength light since a higher proportion of the DC current is supplied to the first light channel 130.

In a similar manner, to reduce the composite CCT of light produced by light source 125 (or equivocally, increase the proportion of long wavelength light output by light source 125), the controller 120 controls a smaller proportion of DC current supplied by variable constant current drive 105 to flow through the first light channel 130 than the second light channel 135. In other words, the controller 120 may decrease the duty cycle, or on time, of the first control signal sent to the first current control 140 and correspondingly increases the duty cycle of the second control signal sent to the second current control 145. For example, the controller 120 may transmit a first control signal having a duty cycle of 0.25 to the first current control 140 such that 25% of the DC current supplied by variable constant current drive 105 is provided to the first light channel 130. Likewise, the controller 120 may transmit a second control signal having a duty cycle of 0.75 to the second current control 145 such that 75% of the DC current supplied by variable constant current drive 105 is provided to the second light channel 135. In the above example, the light produced by light source 125 of lighting system 100 contains a higher proportion of long wavelength light since a higher proportion of the DC current is supplied to the second light channel 135.

During operation of the emergency lighting system 100, the controller 120 may be configured to determine whether emergency alarm 115 is triggered by monitoring signals received from the emergency alarm 115. The controller 120 outputs the first control signal and the second control signal, based on whether emergency alarm 115 is triggered, to the first current control 140 and the second current control 145, respectively. When the emergency alarm 115 is not triggered, the controller 120 is configured to output a first control signal to the first current control 140 that increases the proportion of DC current provided to the first light channel 130. The controller 120 is further configured to output a second control signal to the second current control 145 that decreases the proportion of DC current provided to the second light channel 135. Therefore, the controller 120 is configured to control light source 125 to produce light with a higher concentration of short wavelength light (higher CCT) when there is not an emergency condition present proximate emergency lighting system 100. In contrast, when the emergency alarm 115 is triggered (indicating the presence of an emergency condition), the controller 120 is configured to output a first control signal to the first current control 140 that decreases the proportion of DC current provided to the first light channel 130. The controller 120 is further configured to output a second control signal to the second current control 145 that increases the proportion of DC current provided to the second light channel 135. Thus, the controller 120 is configured to control light source 125 to produce light with a higher concentration of long wavelength light (lower CCT) when an emergency condition is present near emergency lighting system 100.

In some embodiments, the emergency alarm 115 is configured to communicate the type of emergency condition that is present to the controller 120 (for example, smoke detected, carbon monoxide detected, power lost, and the like). In such embodiments, the controller 120 determines how much DC current to provide to the first light channel 130 and the second light channel 135 based on the type of emergency condition that triggered emergency alarm 115. For example, if the emergency alarm 115 was triggered in response to detecting a high concentration of smoke particles, the controller 120 may be configured to control 100% of the DC current supplied by variable constant current drive 105 to be provided to the second light channel 135 and 0% of the DC current supplied by variable constant current drive 105 to be provided to the first light channel 130. As another example, if the emergency alarm 115 was triggered in response to detecting a power outage, the controller 120 may be configured to control 80% of the DC current supplied by variable constant current drive 105 to be provided to the second light channel 135 and 20% of the DC current supplied by variable constant current drive 105 to be provided to the first light channel 130.

Figure 3:
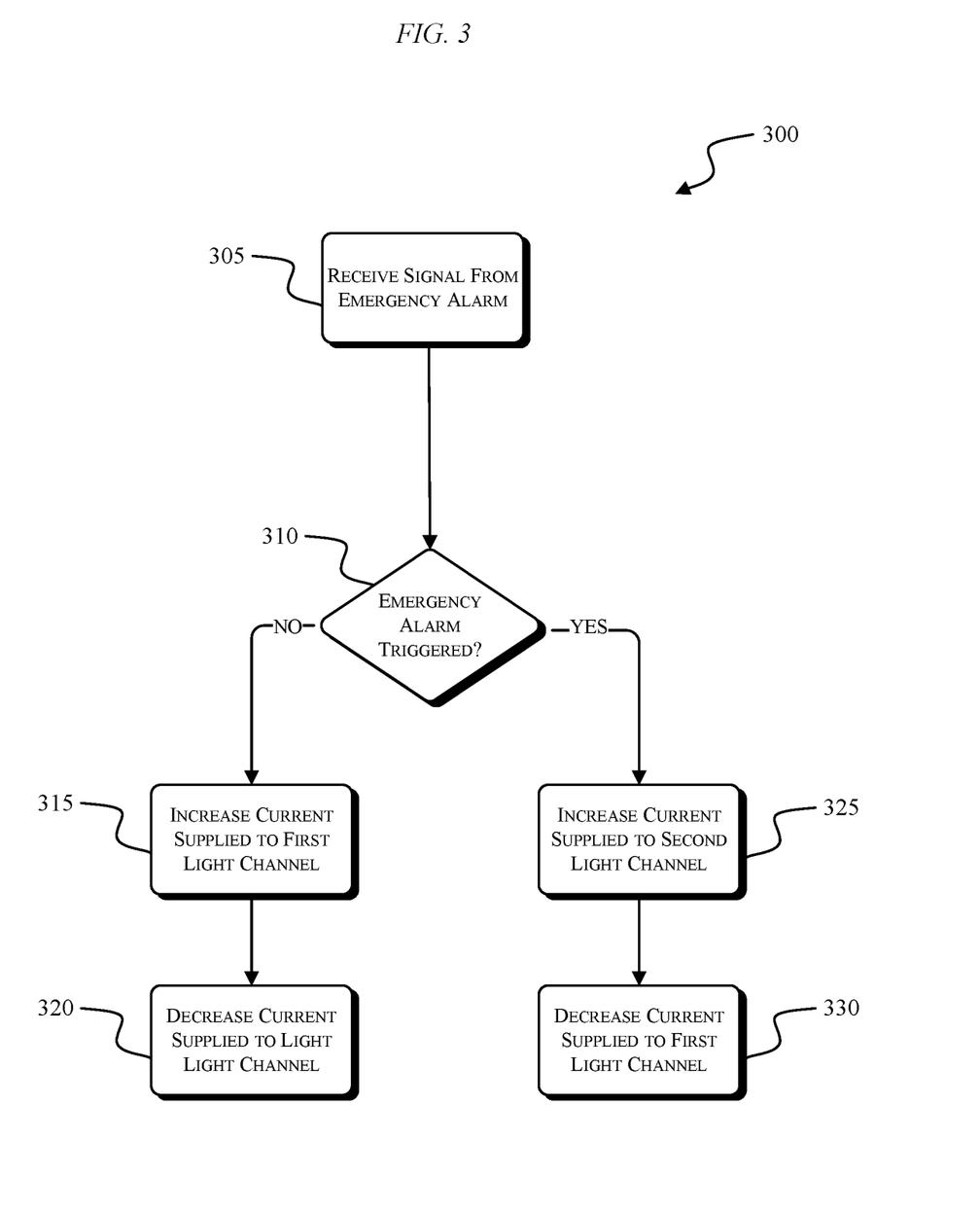
FIG. 3 is a flow chart illustrating an operation, or process, of the emergency lighting system of FIG. 1 according to one embodiment of the application.

FIG. 3 is a flow chart illustrating an operation, or process, 300 of the lighting system 100 according to some embodiments of the application. It should be understood that the order of the steps disclosed in process 300 could vary. Additionally, although illustrated as occurring sequentially, some of the steps may be performed in parallel. Process 300 begins with the controller 120 receiving a signal from emergency alarm 115 (Block 305). Controller 120 determines whether emergency alarm 115 is triggered in response to detecting the presence of an emergency condition (Block 310). If, at Block 310, the controller 120 determines that the emergency alarm 115 is not triggered, the controller 120 increases the proportion of current supplied to the first light channel 130 (Block 315). The controller 120 reduces the proportion of current supplied to the second light channel 135 (Block 320). If, at Block 310, the controller 120 determines that the emergency alarm 115 is triggered, the controller 120 increases the proportion of current supplied to the second light channel 135 (Block 325). The controller 120 reduces the proportion of current supplied to the first light channel 130 (Block 330).

Figure 4:
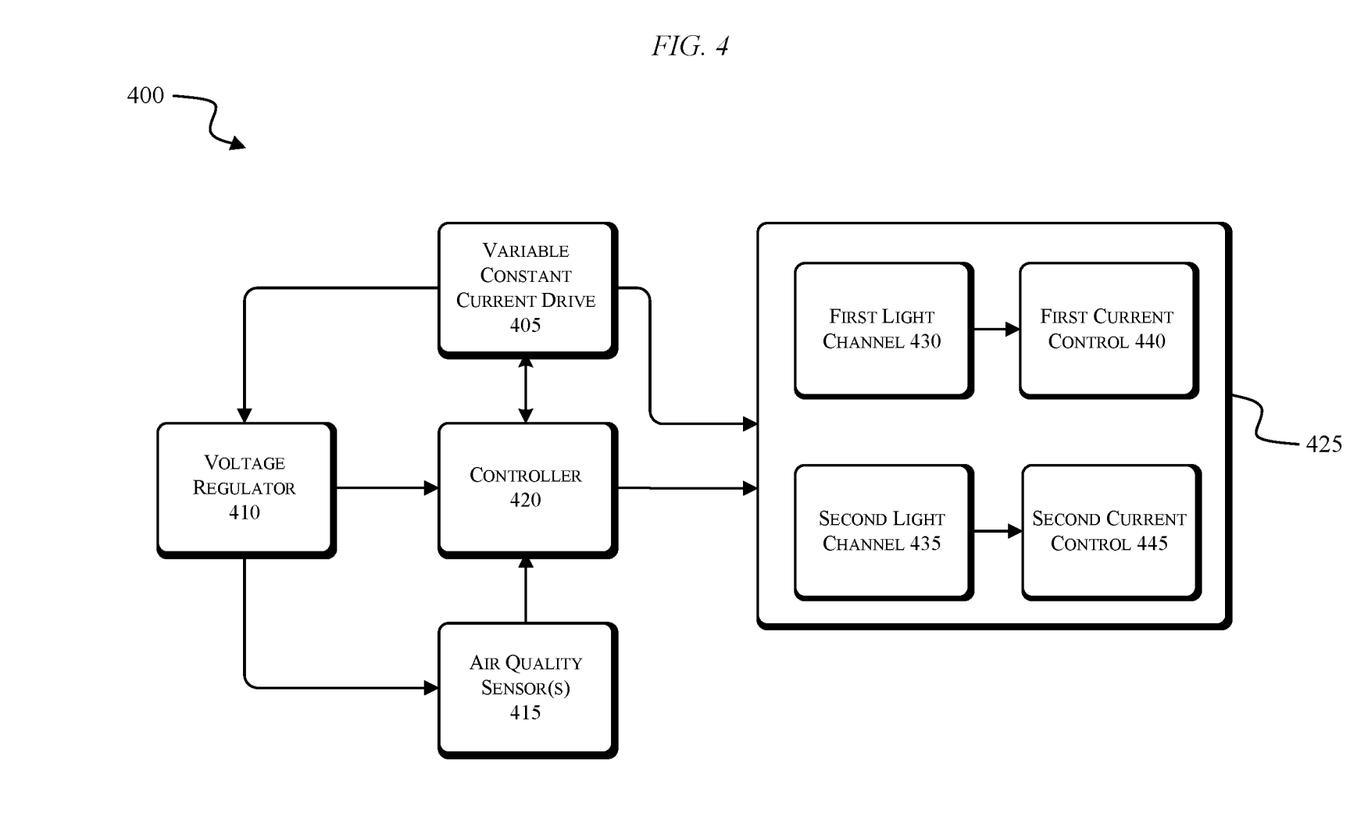
FIG. 4 is a block diagram of an ambient lighting system according to one embodiment of the application.

FIG. 4 illustrates a block diagram of a color temperature tunable ambient lighting system 400 (herein referred to simply as 'ambient lighting system') according to some embodiments. Ambient lighting system 400 may have a similar configuration to that of the emergency lighting system 100 illustrated in FIG. 1; however, the ambient lighting system 400 may additionally include an air quality sensor. As shown in the embodiment of FIG. 4, the ambient lighting system 400 includes, among other things, a variable constant current drive, or driver, 405, a voltage regulator 410, an air quality sensor 415, a controller 420, and at least one light source 425. The light source 425 includes a first light channel 430, a second light channel 435, a first current 440, and a second current control 445. In some embodiments, the light source 425 includes more than two light channels and two current controls. For example, the light source 425 may include as many light channels and/or current controls as are desired. In some embodiments, the ambient lighting system 400 includes more than one light source 425.

The variable constant current drive 405 receives a mains voltage (for example, approximately 120 VAC at 60 Hz, approximately 240 VAC at 60 Hz, etc.) and outputs a DC current to the voltage regulator 410. The voltage regulator 410 receives DC current output from the variable constant current drive 405 and outputs a regulated voltage (e.g., 5 VDC) to provide power to the air quality sensor 415 and the controller 420.

The air quality sensor 415 is configured to measure the amount, or concentration, of particles suspended in the air proximate ambient lighting system 400 and transmit a signal indicative of the measured suspended particle concentration to the controller 420. The air quality sensor 415 may, for example, measure the concentration of fog, ice crystals, smoke, dust, smog, and/or other particle types suspended in the air near ambient lighting system 400. In some embodiments, the air quality sensor 415 measures the humidity level of air proximate the ambient lighting system 400. The air quality sensor 415 may additionally be configured to measure the size of the particles suspended in the air proximate the ambient lighting system 400. In some embodiments, the ambient lighting system 400 includes a plurality of air quality sensors 415, wherein each of the plurality of air quality sensors 415 is configured to measure the concentration and/or size of a different type of particle suspended in the air proximate the ambient lighting system 400.

The controller 420 may be any suitable programming device that includes an electronic processor and a memory (e.g., a microprocessor, a microcontroller, etc.). In some embodiments, the controller 420 is implemented partially or entirely on a semiconductor (e.g., a field-programmable gate array semiconductor) chip, such as a chip developed through a register transfer level design process. The electronic processor may be connected to the memory and configured to execute software instructions stored in the memory. The software includes, for example, firmware, one or more applications, program data, filters, rules, one or more program modules, and/or other executable instructions. The controller 420 is configured to retrieve from the memory and execute, among other things, instructions related to the control processes and methods described herein. For example, and as discussed in more detail below, the controller 420 is configured to process the suspended particle concentration measurement received from the air quality sensor 415 and output a first control signal and a second control signal, based on the measured suspended particle concentration, to the first current control 440 and the second current control 445, respectively.

As illustrated in FIG. 4, the DC current supplied by variable constant current drive 405 to the light source 425 flows through the first light channel 430 and the second light channel 435 to the first current control 440 and the second current control 445, respectively. In other embodiments, the DC current supplied by variable constant drive 405 to the light source 425 flows through the first current control 440 and the second current control 445 to the first light channel 430 and the second light channel 435, respectively. In some embodiments of the ambient lighting system 400, the first light channel 430 includes a first plurality of white LEDs that produce light at a first CCT and the second light channel 435 includes a second plurality of white LEDs that produce light at a second CCT. In such embodiments, the first CCT of the light produced by the first plurality of white LEDs is greater than the second CCT of the light produced by the second plurality of white LEDs. Accordingly, the first plurality of white LEDs in the first light channel 430 produces shorter wavelengths of light when compared to the wavelengths of light produced by the second plurality of white LEDs included in the second light channel 435. In some embodiments, the second light channel 435 includes one or more LEDs that produce relatively longer wavelengths of light. For example, the second light channel 135 may include one or more amber LEDs, red LEDs, yellow LEDs, or any other type of LEDs that produce light at relatively long wavelengths. In some embodiments, the first light channel 430 and the second light channel 435 include one or more LEDs having various colors, such as but not limited to, red, green, yellow, amber, variations of white, or any other desired color.

As discussed above with respect to the embodiment of ambient lighting system 400 illustrated in FIG. 4, DC current passes through the first light channel 430 and the second light channel 435 to the first current control 440 and the second current control 445, respectively. In some embodiments, the first current control 440 and the second current control 445 are transistors (e.g., a semiconductor device, such as but not limited to, a bipolar junction transistor (BJT), a field-effect transistor (FET), a metal-oxide-semiconductor field-effect transistor (MOSFET), a junction gate field-effect transistor (JFET), and an insulated-gate bipolar transistor (IGBT)). In such embodiments, the controller 420 outputs a first control signal and a second control signal to a first gate of the first current control 440 and a second gate of the second current control 440, respectively, in order to control the flow of DC current through, and equivocally, light output by the first light channel 430 and the second light channel 435. The first and second control signals may be, for example, pulse-width modulated (PWM) signals.

Light source 425 produces a combined light output of the first light channel 430 and the second light channel 435 at a composite CCT. The composite CCT of light produced by light source 425 can be adjusted by selectively controlling the DC current that is provided to the first light channel 430 and the second light channel 435. When air quality is high, meaning the concentration of suspended particles in the air is low, it is desirable for the light source 425 of ambient lighting system 400 to produce a higher concentration of short wavelength white light (higher CCT) for improved efficacy. Accordingly, the controller 420 is configured to increase the composite CCT of the combined light produced by the first light channel 430 and the second light channel 435. In contrast, when air quality is low, meaning the concentration of suspended particles in the air is determined to be high, it is desirable for the light source 425 of ambient lighting system 400 to produce a higher concentration of long wavelength white light to reduce scattering. Thus, the controller 420 is configured to reduce the composite CCT of the combined light produced by the first light channel 430 and the second light channel 435 when air quality is low.

As described above, the first plurality of white LEDs included in the first light channel 430 produces light at a first CCT that is higher than the second CCT of light produced by the second plurality of white LEDs included in the second light channel 435. Therefore, to increase the composite CCT of light produced by light source 425 (or equivocally, increase the proportion of short wavelength light output by light source 425), the controller 420 controls a larger proportion of DC current supplied by variable constant current drive 405 to flow through the first light channel 430 than the second light channel 435. In other words, the controller 420 increases the duty cycle, or on time, of the first control signal sent to the first current control 440 and correspondingly reduces the duty cycle of the second control signal sent to the second current control 445. For example, the controller 420 may transmit a first control signal having a duty cycle of 0.75 to the first current control 440 such that 75% of the DC current supplied by variable constant current drive 405 is provided to the first light channel 430. Likewise, the controller 420 may transmit a second control signal having a duty cycle of 0.25 to the second current control 445 such that 25% of the DC current supplied by variable constant current drive 405 is provided to the second light channel 435. In the above example, the light produced by light source 425 of ambient lighting system 400 contains a higher proportion of short wavelength light because a higher proportion of the DC current supplied by variable constant current drive 405 is provided to the first light channel 430.

In a similar manner, to reduce the composite CCT of light produced by light source 425 (or equivocally, increase the proportion of long wavelength light output by light source 425), the controller 420 controls a smaller proportion of DC current supplied by variable constant current drive 405 to flow through the first light channel 430 than the second light channel 435. In other words, the controller 420 decreases the duty cycle, or on time, of the first control signal sent to the first current control 440 and correspondingly increases the duty cycle of the second control signal sent to the second current control 445. For example, the controller 420 may transmit a first control signal having a duty cycle of 0.25 to the first current control 440 such that 25% of the DC current supplied by variable constant current drive 405 is provided to the first light channel 430. Likewise, the controller 420 may transmit a second control signal having a duty cycle of 0.75 to the second current control 445 such that 75% of the DC current supplied by variable constant current drive 405 is provided to the second light channel 435. In the above example, the light produced by light source 425 of ambient lighting system 400 contains a higher proportion of long wavelength light because a higher proportion of the DC current is provided to the second light channel 435.

During operation of the ambient lighting system 400, the controller 420 is configured to process the measured suspended particle concentration signal received from the air quality sensor 415 and output the first control signal and the second control signal, based on the measured suspended particle concentration signal, to the first current control 440 and the second current control 445, respectively. In some embodiments, the controller 420 compares the suspended particle concentration to one or more particle thresholds to determine how much DC current to provide to the first light channel 430 and the second light channel 435, respectively. In such embodiments, when the measured suspended particle concentration is determined to be less than a particle threshold (indicating good air quality/low particle concentration), the controller 420 is configured to output a first control signal to the first current control 440 that increases the proportion of DC current provided to the first light channel 430. The controller 420 is further configured to output a second control signal to the second current control 445 that decreases the proportion of DC current provided to the second light channel 435. Therefore, the controller 420 is configured to control light source 425 to produce light with a higher concentration of short wavelength light (higher CCT) when the concentration of particles suspended in air near the ambient lighting system 400 is less than a particle threshold. In contrast, when the measured suspended particle concentration is determined to be greater than or equal to a particle threshold (indicating poor air quality/high particle concentration), the controller 420 is configured to output a first control signal to the first current control 440 that decreases the proportion of DC current provided to the first light channel 430. The controller 420 is further configured to output a second control signal to the second current control 445 that increases the proportion of DC current provided to the second light channel 435. Thus, the controller 420 is configured to control light source 425 to produce light with a higher concentration of long wavelength light (lower CCT) when the concentration of particles suspended in air near the ambient lighting system 400 is greater than or equal to a particle threshold.

For example, when the controller 420 determines that the concentration of suspended particles in the air proximate ambient lighting system 400 is less than the particle threshold, the controller 420 may control 75% of the DC current supplied by variable constant current drive 405 to be supplied to the first light channel 430 and 25% of the DC current supplied by variable constant current drive 405 to be supplied to the second light channel 435. Accordingly, the combined light produced by light source 425 would contain a higher proportion of short wavelength light as well as have a higher composite CCT. In another example, when the controller 420 determines that the concentration of suspended particles in the air proximate ambient lighting system 400 is above the particle threshold, the controller 420 may control 75% of the DC current supplied by variable constant current drive 405 to be supplied to the second light channel 435 and 25% of the DC current supplied by variable constant current drive 405 to be supplied to the first light channel 430. Accordingly, the combined light produced by light source 425 would contain a higher proportion of long wavelength light, as well as have a lower composite CCT.

It should be understood that the controller 420 may be configured to selectively supply varying proportions of the DC current supplied by variable constant current drive 405 to the first and second light channels 430, 435 based on the measured concentration of suspended particles in the air proximate ambient lighting system 400. For example, in some embodiments, when the measured concentration of suspended particles is less than the particle threshold, the controller 420 is configured to control 100% of the DC current supplied by variable constant current drive 405 to be supplied to the first light channel 430 and 0% of the DC current supplied by variable constant current drive 405 to be supplied to the second light channel 435.

Figure 5:
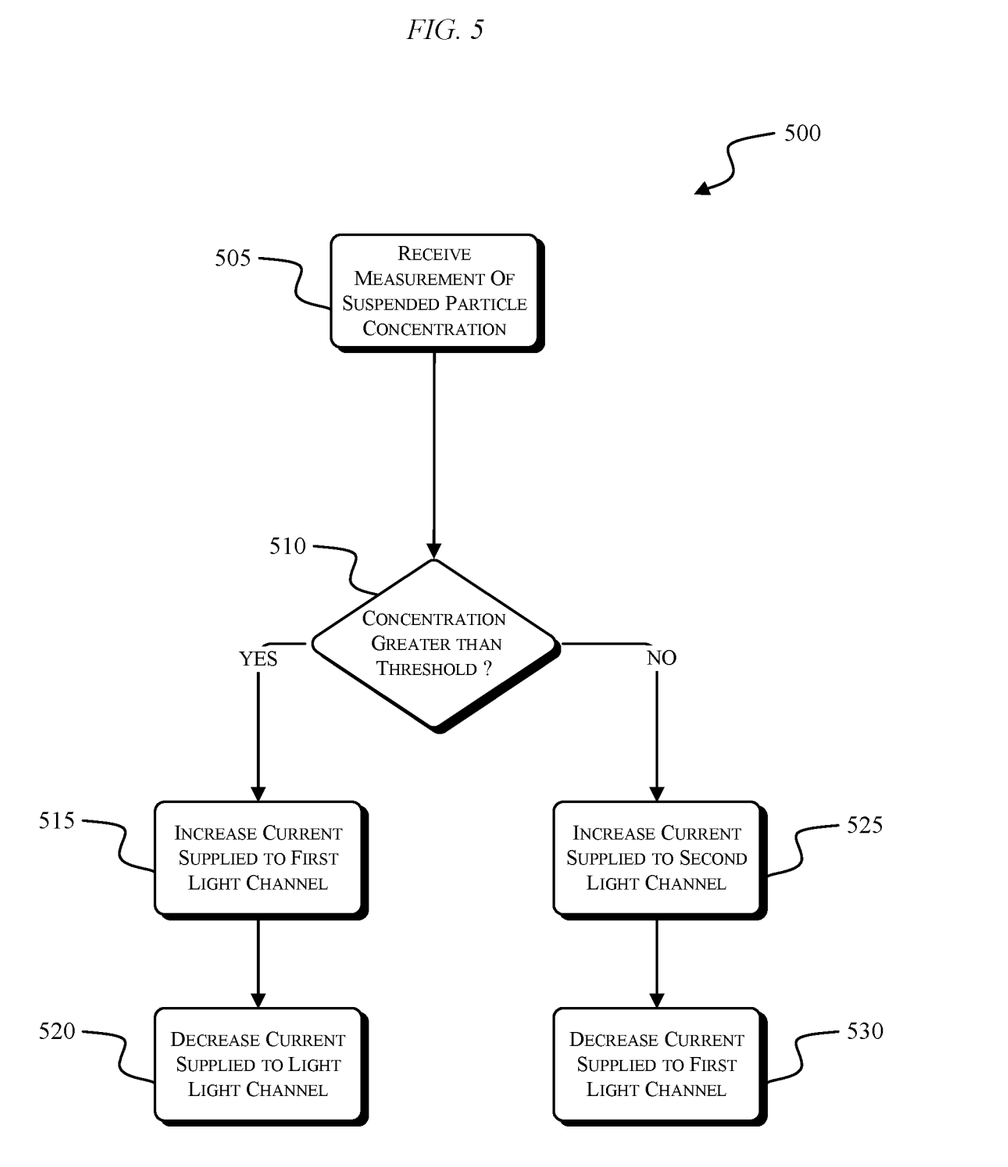
FIG. 5 is a flow chart illustrating an operation, or process, of the ambient lighting system of FIG. 4 according to one embodiment of the application.

FIG. 5 is a flow chart illustrating an operation, or process, 500 of the ambient lighting system 400 according to some embodiments of the application. It should be understood that the order of the steps disclosed in process 500 could vary. Additionally, although illustrated as occurring sequentially, some of the steps may be performed in parallel. Process 500 begins with the controller 420 receiving a measurement of the concentration of suspended particles from air quality sensor 415 (Block 505). Controller 420 compares the concentration of suspended particles to a particle threshold (Block 510). If, at Block 510, the controller 420 determines that the concentration of suspended particles is less than the particle threshold, the controller 420 increases the proportion of current supplied to the first light channel 430 (Block 515). The controller reduces the proportion of current supplied to the second light channel 435 (Block 520). If, at Block 510, the controller 420 determines that the concentration of suspended particles is greater than or equal to the particle threshold, the controller 420 increases the proportion of current supplied to the second light channel 435 (Block 525). The controller reduces the proportion of current supplied to the first light channel 430 (Block 530).

Thus, the disclosure provides, among other things, emergency and ambient lighting systems capable of outputting light at a variety of wavelengths and/or correlated color temperatures. Various features and advantages of the various embodiments disclosed herein are set forth in the following claims.

What is claimed is:

1. An emergency lighting system comprising:
    a light source including:
        a first light channel including a first plurality of white light emitting diodes (LEDs) that produce light at a first correlated color temperature (CCT);
        a second light channel including a second plurality of white LEDs that produce light at a second CCT that is less than the first CCT;
    a variable constant current drive configured to supply DC current to the first light channel and the second light channel;
    an emergency alarm configured to be triggered upon detecting the presence of an emergency condition proximate the emergency lighting system; and
    a controller having an electronic processor configured to:
        determine whether the emergency alarm is triggered;
        increase the DC current supplied to the first light channel when the emergency alarm is not triggered; and
        decrease the DC current supplied to the first light channel when the emergency alarm is triggered.

2. The emergency lighting system of claim 1, wherein the controller is further configured to reduce the DC current supplied to the second light channel when the emergency alarm is not triggered.

3. The emergency lighting system of claim 1, wherein the controller is further configured to increase the DC current supplied to the second light channel when the emergency alarm is triggered.

4. The emergency lighting system of claim 1 further comprising a second light source.

5. The emergency lighting system of claim 4, wherein the second light source includes:
    a third light channel including a third plurality of white LEDs that produce light at a third CCT; and
    a fourth light channel including a fourth plurality of white LEDs that produce light at a fourth CCT that is less than the third CCT.

6. The emergency lighting system of claim 1, wherein the second light channel further includes a LED that produces light at longer wavelengths than the second plurality of white LEDs.

7. The emergency lighting system of claim 1, wherein the second light channel further includes one or more selected from a group consisting of amber LEDs, red LEDs, and yellow LEDs.

8. The emergency lighting system of claim 1, wherein the emergency alarm is a smoke detector.

9. The emergency lighting system of claim 1, wherein the emergency alarm is a carbon monoxide detector.

10. The emergency lighting system of claim 1, wherein the controller is further configured to determine a type of the emergency condition proximate the emergency lighting system.

11. The emergency lighting system of claim 10, wherein the controller is further configured to determine an amount of DC current to supply the first light channel based on the type of emergency condition proximate the emergency lighting system.

12. An ambient lighting system comprising:
a light source including:
- a first light channel including a first plurality of white light emitting diodes (LEDs) that produce light at a first correlated color temperature CCT;
- a second light channel including a second plurality of white LEDs that produce light at a second correlated color temperature that is less than the first CCT;

a variable constant current drive configured to supply DC current to the first light channel and the second light channel;

an air quality sensor configured to measure a concentration of particles suspended in air proximate the ambient lighting system; and a controller having an electronic processor configured to:
- receive a signal indicative of the concentration of particles suspended in air proximate the lighting system;
- compare the concentration of particles suspended in air proximate the lighting system to a first threshold;
- increase the DC current supplied to the first light channel when the concentration of particles suspended in air proximate the lighting system is less than the first threshold; and
- decrease the DC current supplied to the first light channel when the concentration of particles suspended in air proximate the lighting system is greater than or equal to the first threshold.

13. The ambient lighting system of claim 12, wherein the controller is further configured to reduce the DC current supplied to the second light channel when the concentration of particles suspended in air proximate the lighting system is less than the first threshold.

14. The ambient lighting system of claim 12, wherein the controller is further configured to increase the DC current supplied to the second light channel when the concentration of particles suspended in air proximate the lighting system is greater than or equal to the first threshold.

15. The ambient lighting system of claim 12 further comprising a second light source.

16. The ambient lighting system of claim 15, wherein the second light source includes:
- a third light channel including a third plurality of white LEDs that produce light at a third CCT; and
- a fourth light channel including a fourth plurality of white LEDs that produce light at a fourth CCT that is less than the third correlated color temperature.

17. The ambient lighting system of claim 12, wherein the second light channel further includes a LED that produces light at longer wavelengths than the second plurality of white LEDs.

18. The ambient lighting system of claim 12, wherein the second light channel further includes one or more selected from a group consisting of amber light emitting diodes, red light emitting diodes, and yellow light emitting diodes.

19. The ambient lighting system of claim 12, wherein the particles suspended in air are fog particles.

20. The ambient lighting system of claim 12, wherein the particles suspended in air are smoke particles.

21. The ambient lighting system of claim 12, wherein the light source further includes a first current control electrically connected in series with the first light channel.

22. The ambient lighting system of claim 12, wherein the light source further includes a second current control electrically connected in series with the second light channel.

* * * * *